United States Patent [19]
Ohlendorf et al.

[11] Patent Number: 4,458,965
[45] Date of Patent: Jul. 10, 1984

[54] DRAWER MADE OF PLASTIC

[75] Inventors: Heinz Ohlendorf, Bad Salzuflen; Hans Riepe, Enger, both of Fed. Rep. of Germany

[73] Assignee: Paul Hettich GmbH & Co., Kirchlengern, Fed. Rep. of Germany

[21] Appl. No.: 380,013

[22] Filed: May 19, 1982

[30] Foreign Application Priority Data

May 21, 1981 [DE] Fed. Rep. of Germany ....... 3120181

[51] Int. Cl.³ .............................................. A47B 88/00
[52] U.S. Cl. ................................ 312/330 R; 312/204; 312/263; 403/316; 403/321
[58] Field of Search .................... 312/330, 257 A, 204, 312/263, 264; 403/316, 315, 322, 341, 321; 292/190

[56] References Cited

U.S. PATENT DOCUMENTS

| 1,907,506 | 5/1933 | Coburn | 403/315 |
| 3,687,512 | 8/1972 | Alston | 312/330 |
| 4,113,397 | 9/1978 | Snyder | 403/316 |
| 4,120,598 | 10/1978 | Zernig et al. | 312/263 |
| 4,131,376 | 12/1978 | Busse | 312/263 |
| 4,173,380 | 11/1979 | Düpree | 312/330 |

FOREIGN PATENT DOCUMENTS

| 630416 | 11/1961 | Canada | 312/263 |
| 2812922 | 5/1979 | Fed. Rep. of Germany | 312/263 |
| 1311150 | 5/1963 | France | 312/263 |
| 860886 | 2/1961 | United Kingdom | 312/263 |

Primary Examiner—William E. Lyddane
Assistant Examiner—Thomas A. Rendos
Attorney, Agent, or Firm—Michael J. Striker

[57] ABSTRACT

A drawer of plastic has a front plate, a body part with a front face to arrange the front plate parallel to the latter and a plurality of side walls each forming a downwardly open chamber and having a front region adjacent to the front face, and elements for connecting the front plate with the side walls and including a hasp arranged in the front region of each of the side walls and having a transverse bolt, an elongated bracket having a longitudinal axis and an end provided with a fork which is snappable on the transverse bolt, and at least one tightening cam outwardly engaging the fork, wherein the bracket is held on the front plate so that its longitudinal axis extends normal to the front plate and also is movable in a direction normal to the longitudinal axis.

17 Claims, 7 Drawing Figures

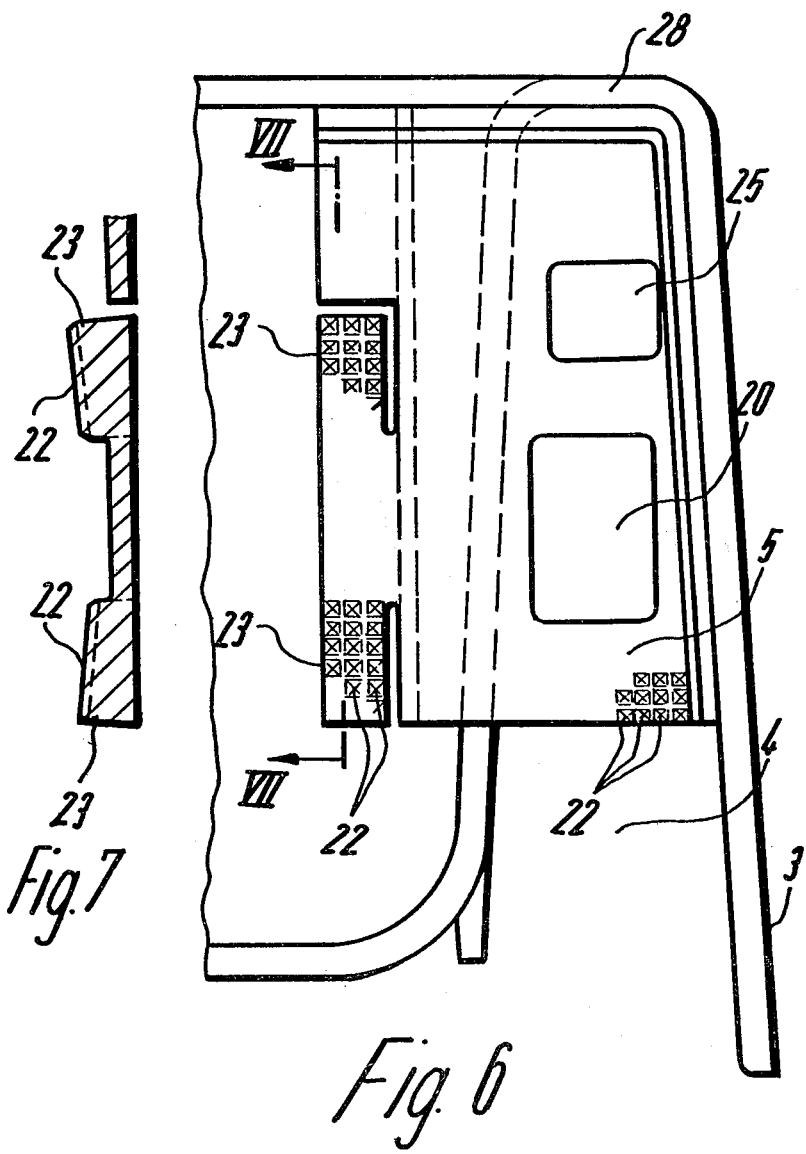

DRAWER MADE OF PLASTIC

BACKGROUND OF THE INVENTION

The subject invention relates to a drawer made of plastic with a front plate alignable parallel with the front face and with side walls forming downwardly open hollow chambers in their cross section, whereby in the front area hasps are provided with tightening cams and holding elements are mounted on the front plate engaging with the hasps.

In the known drawers of the aforementioned type the hasps are formed like an excenter lock as it is generally known in the furniture branch. As holding elements undercut bolts are used which have a head and which must at first be introduced with their heads into an introduction opening of the hasp and with a subsequent twisting the tightening cams of the hasps engage the heads of the bolts, so that a certain mounting of the front plate is assured. After the aligning of the front plate the hasps are finally tightened.

Therefore, it is required to execute two operating steps for mounting the front plate, namely at first to introduce the bolts into the hasps and subsequently to turn the two hasps into a certain tightening position.

SUMMARY OF THE INVENTION

It is therefore an object of the invention to construct a drawer of the aforementioned type in such a manner that the front plate can be fixed in a preassembled position to the drawer in a single operating step.

The solution of this object of the invention consists in accordance with the invention that each hasp is provided with a transverse bolt on which a fork is mounted and tip-stretched on the front end of a bracket and which can snap open being engaged at the rear on the outside by at least one tightening cam of the hasp, whereby the bracket is supported on the front plate and is moveable transversely to its longitudinal axis which is positioned vertical to the front plate.

Due to the inventive structure it is possible to mount the front plate in a single operating step in a preassembled position on the drawer body, because only the snapping open of the forks onto the transverse bolts of the hasps is required. By this snap connection the front plate is fixed to such an extent that it cannot detach itself from the drawer body, so that the drawer with the provisional fixed front plate can be transported to another operating station at which the final mounting and adjusting of the front plate should take place, for example.

The novel features which are considered characteristic for the present invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
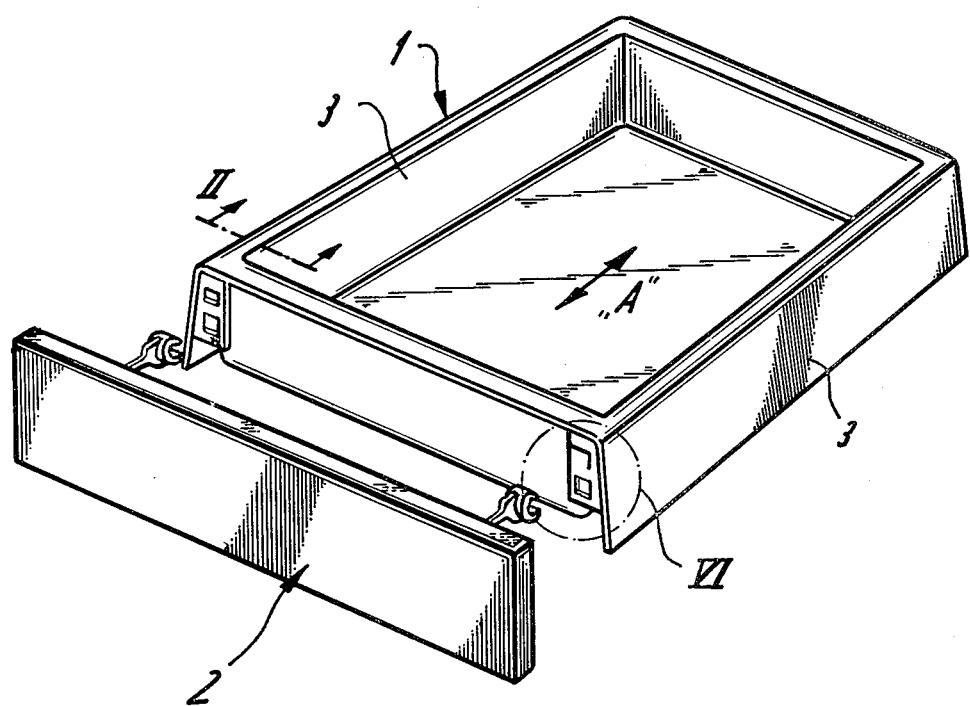
FIG. 1 a perspective illustration of a drawer made of plastic with a front plate to be mounted thereon, FIG. 2 a partial section in accordance with line II—II of FIG. 1 after the mounting of the front plate, FIG. 3 a section along line III—III of FIG. 2, FIG. 4 a section alone line IV—IV of FIG. 3, FIG. 5 a view of the essential connecting elements with which the front plate is fixed on the drawer, FIG. 6 the detail of VI shown in FIG. 1 in an enlarged illustration and FIG. 7 a partial section in accordance with line VII of FIG. 6.

FIG. 1 shows a drawer made of plastic on which a front plate 2 is mounted on the front side thereof.

The moving direction of the drawer 1 is characterized by the double arrow A illustrated in FIG. 1.

Figure 2:
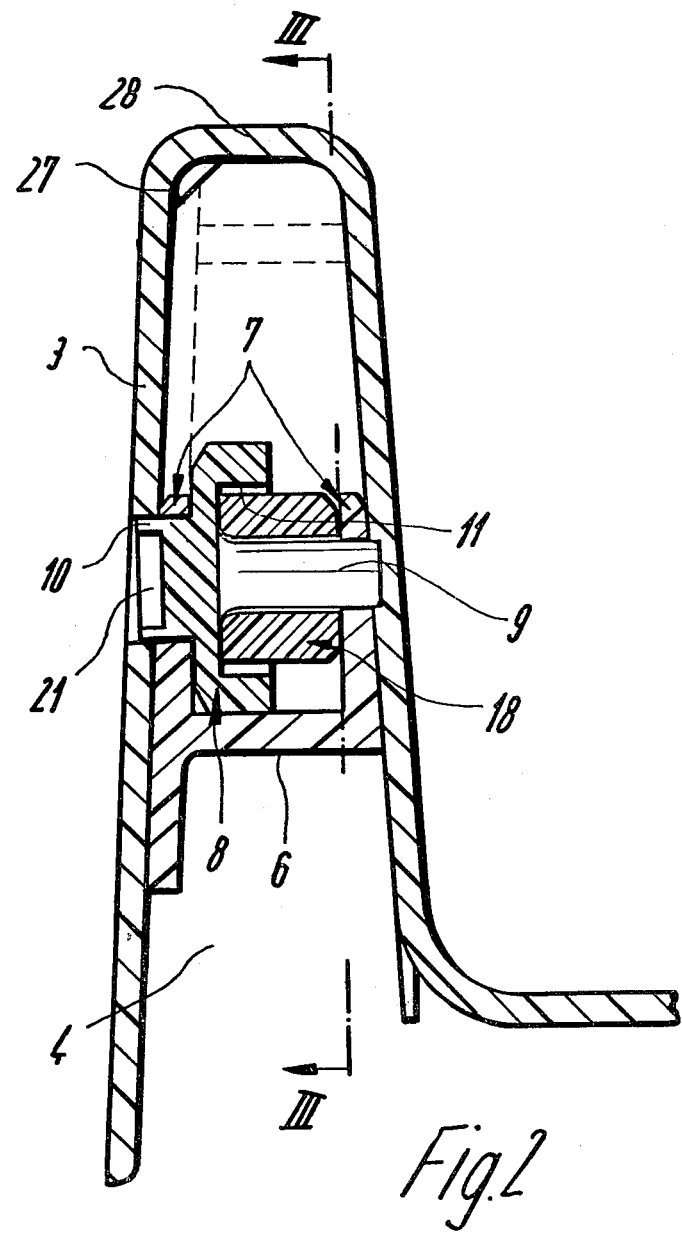

The side walls 3 of the drawer 1 are structured in such a manner in that they form downwardly directed open hollow chambers 4 which is shown in particular in FIGS. 2 and 6.

The hollow chambers 4 are closed in the front area up to the upper side by a wall 5.

Insert parts 6 are inserted into the hollow chambers 4 and are provided with a fork like guide portion 7 which is open toward the rear side of drawer 1. A hasp 8 is inserted into these guiding portions 7. The hasps 8 are provided with a transverse bolt 9 and with a support pin 10, whereby the transverse bolt 9 protrudes to that side of the hasp 8 at which the hasp 8 is provided with a tightening cam 11 which is mounted excentrically with respect to the rotating axis of the transverse bolt 9 and support pin 10. The support pin 10 whose diameter is larger than the diameter of the transverse bolt 9 extends beyond the hasp 8 on the other side. The hasp 8 can be snapped into the fork like guiding portion 7, so that the hasp 8 can be turned around the axis of the transverse bolt 9 and support pin 10, but a displacement of the hasp 8 transversely to the mentioned longitudinal axis of the transverse bolt 9 and support pin 10 is not possible any more.

Figure 3:
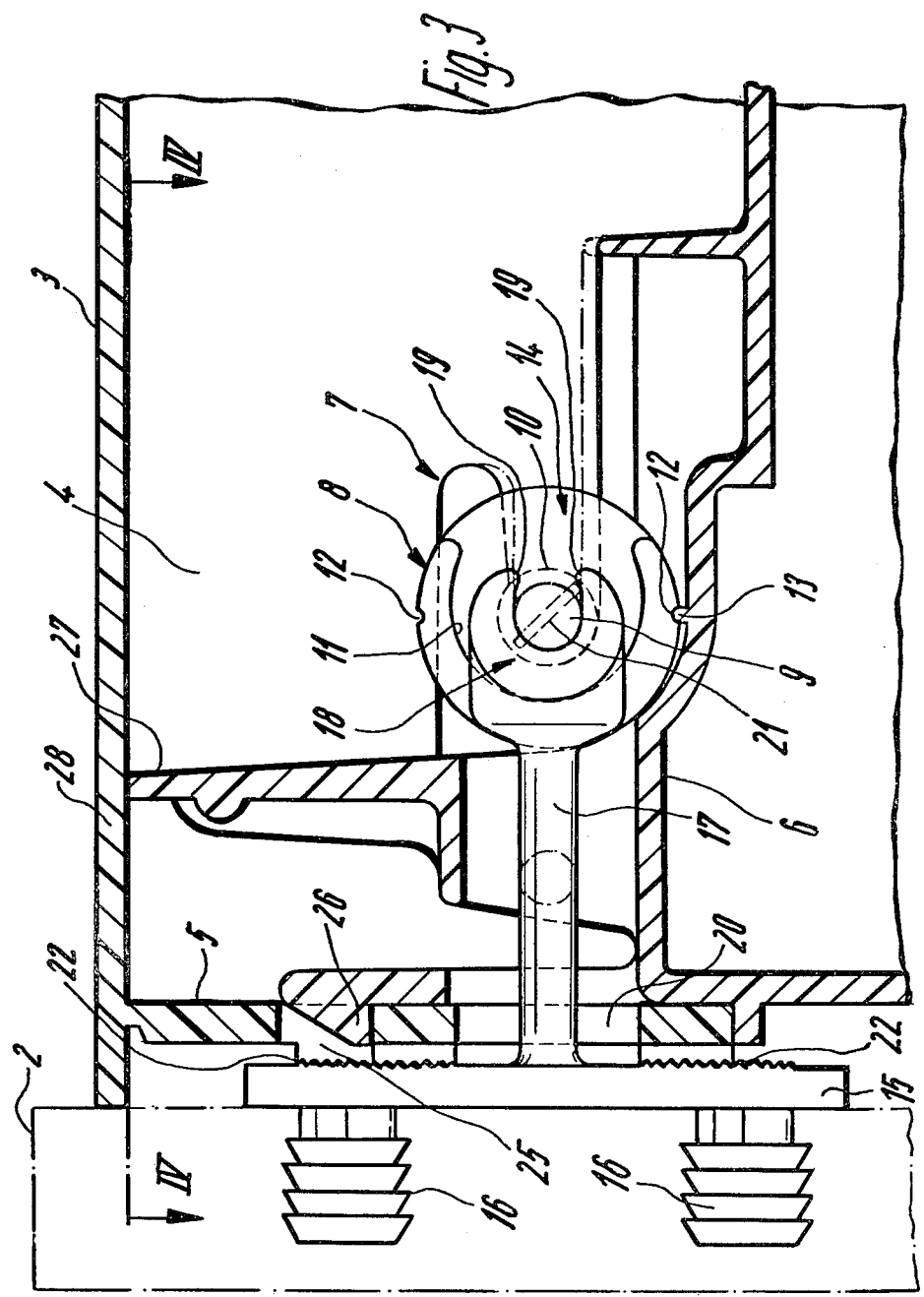
Figure 4:
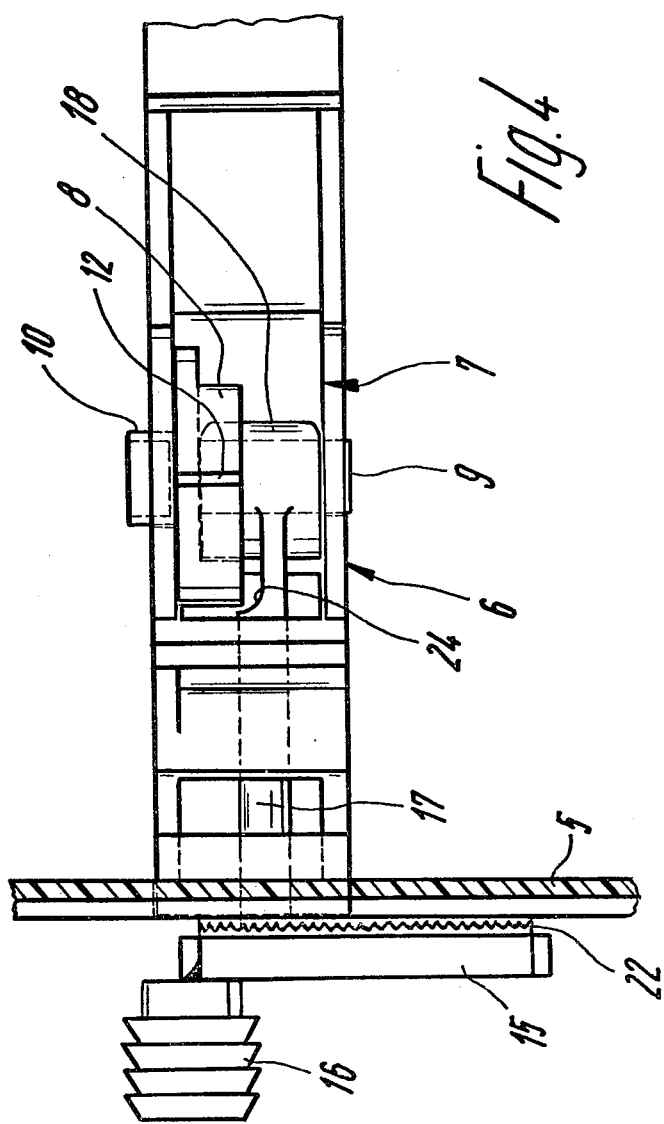

The hasps 8 are provided with two grooves 12 mounted circumferentially and offset with respect to each other at an angle of 180° and an engagement shoulder 13 is tip stretched on insert part 6 which engages into one of grooves 12. By this measure the hasp 8 can be fixed into two different rotating positions, that is, into its operating position shown in FIG. 3, on the one hand, so that the introduction opening 14, which is limited by the tightening cam, points to the front face of drawer 1.

A support plate 15 is mounted on front plate 2 which is made of plastic in the illustrated exemplified embodiment and is provided with two mounting dowels 16. In addition to the mounting dowels 16 the support plate 15 may be provided with through bores, so that a selective mounting of the front plate 15 on a front plate 2 is made possible by means of the dowels 16 and/or mounting screws.

A bracket 17 is unitarily tip stretched on the support plate 15 whose longitudinal axis is positioned normal to the front plate 2 when the support plate 15 is mounted on the front plate 2. A fork 18 is tip stretched on the free end of the bracket 17 and can be snapped onto the transverse bolt 9 of the hasp 8. For this purpose the fork 18 is provided with two opposite engagement shoulders 19 in its opening range, whose clearance with respect to each other is smaller than the outer diameter of transverse bolt 9.

The bracket 17 of support plate 15 is provided with a relative small diameter, so that the possibility exists to move the bracket 17 transversely to its longitudinal axis due to its flexibility. Naturally, the movement of bracket 17 is possible in all directions with respect to its longitudinal axis.

The mounting of the front plate 2 on drawer 1 is performed in the following manner: After inserting the insert parts 6 into the hollow chambers 4 of the side walls 3 the hasps 8 are at first snapped into the fork like guiding portions 7. The hasps 8 are turned in such a manner that their introduction openings 14 point to the front side of drawer 1. This position is fixed by one of the notches 12 and the engagement shoulder 13 of the insert part 6.

Two support plates 15 with brackets 17 and the associated tip stretched fork 18 are mounted on front plate 2. The brackets 17 with the tip stretched forks 18 can be inserted through insert openings 20 of the walls 5 which close the hollow chambers 4 and the forks 18 can be snapped onto the transverse bolts 9 of hasps 8. Due to this simple manipulation the front plate 2 is at first prefixed on drawer 1 without any further operating steps, i.e., the front plate 2 cannot detach itself. By turning the hasps 8, which are provided with a transverse slot 21 in the area of its support pins 10 for this purpose and into which a screw driver can be inserted, the tightening cams of the hasps 8 can be turned into a position in which they engage the forks 18 at the rear of the front ends of brackets 17. Due to the excentric arrangement of the tightening cams 11 with respect to the longitudinal axis of transverse bolts 9 and support pins 10 a tightening torque is generated by which the support plates 15 and thereby the front plate 2 are tightened to the front face of drawer 1. The front plate 2 is fixed stationary on the front face of drawer 1 in the final tightening position.

Since the brackets 17 of the support plates 15 are moveable transversely to its longitudinal axis, an alignment of the same can be performed before the final fixing of the front plate 2 in all directions parallel to the front face of drawer 1.

Figure 5:
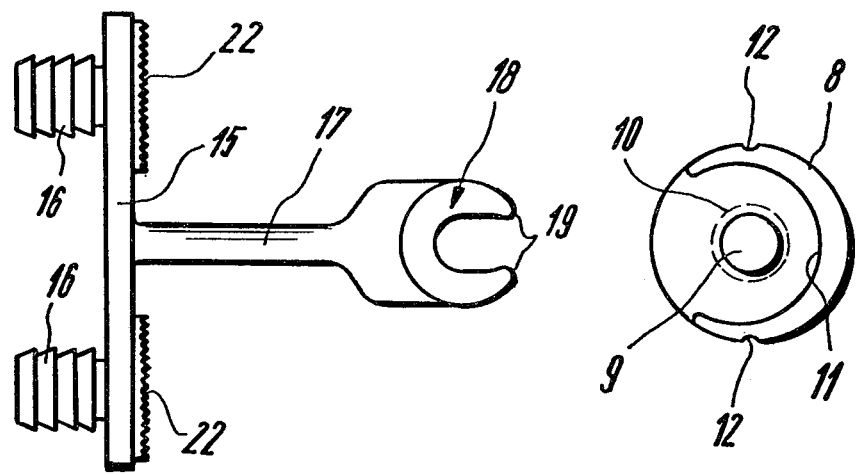

As can be seen in particular from FIGS. 5 and 6 a cross like structure 22 is mounted on each support plate 15 as well as on the front sides of walls 5. Due to this structure 22 a positive locking is obtained after the final tightening of the hasps 8 between the opposite faces of the support plates 15 and walls 5 which additionally secures the adjusted position of the front plate 2.

As can be seen from FIGS. 6 and 7 each wall 5 are provided with two yielding cover plates 23 whose surface protrudes somewhat with respect to the remainder of the surface of walls 5. Thereby, a slight tightening of the hasps 8 results in a certain fixing of the front plate 2 within the adjustment plane, but a displacement of the front plate 2 for alignment purposes is still possible, since the yielding cover plates 23 can yield rearwardly within the alignment plane when displacing the front plate 2.

In the illustrated exemplified embodiment the hasps 8 are provided with one tightening cam 11 and engage the rear of the forks 18 at one side only. Thus, a particularly space saving structure is obtained which assures a reliable fixing, in particular when the brackets 17 are provided with a recess 24 in the area at which the tightening cam 11 of the hasps 8 engages the fork 18. Thereby, the tightening cam 11 of each hasp 8 can be moved very close to the longitudinal axis of brackets 17, so that the power output between the hasp 8 and fork 18 takes place in the area of the longitudinal axis of bracket 17.

Naturally, it is also possible to shape the hasps 8 in such a manner that they can be provided with two tightening cams 11 which engage the rear of the fork 18 of one bracket 17 at two sides. However, as already mentioned before this would enlarge the total structure.

The insert part 6 which is provided with a catch hook 26 engaging an opening 25 of the wall 5 and a supporting rib 27 which supports the upper transverse rib 28 of the hollow chamber type side wall 3 may be a structural part which is merely defined to receive a hasp 8. However, it is also possible to shape the insert part 6 in such a manner that it extends over the total length of the drawer and is designed in its lower end area as a guide bar for the drawer 1.

Preferably, the insert part 6 as well as the drawer 1 and the support plate 15 with the tip stretched parts are made of plastic.

It will be understood that each of the elements described above, or two or more together, may also find a useful application in other types of constructions differing from the types described above.

While the invention has been illustrated and described as embodied in a drawer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

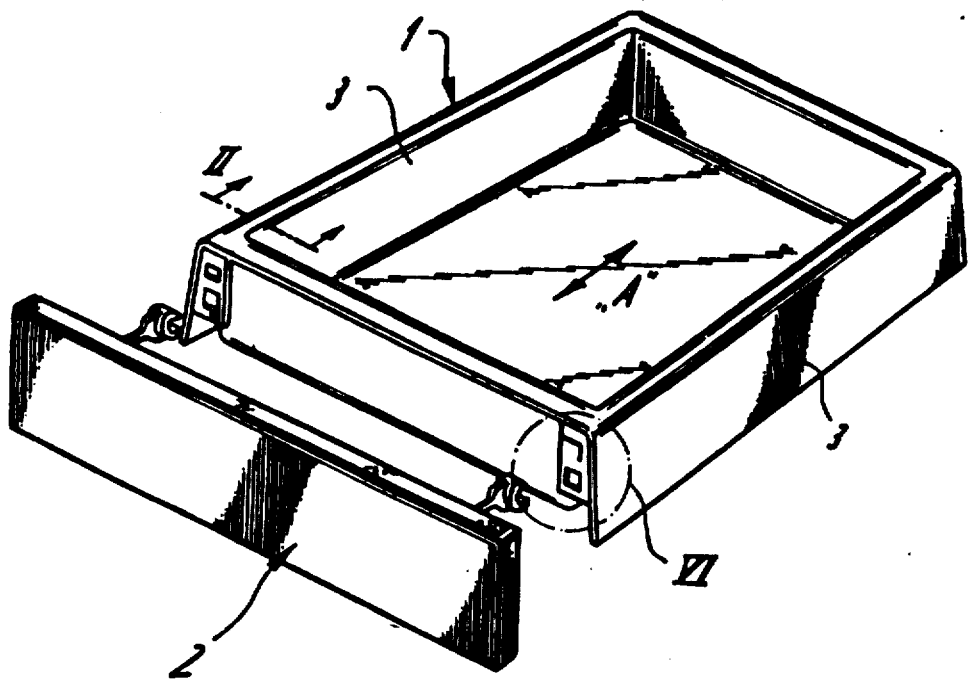

What is claimed as new and desired to be protected by Letters Patent is set forth in the appended claims.

1. A drawer of plastic, comprising
    a front plate;
    a body part having a front face to arrange said front plate parallel to the latter, and a plurality of side walls each forming a downwardly open chamber and having a front region adjacent to said front face; and
    means for connecting said front plate with said side walls, said connecting means includng a hasp arranged in the front region of and fixed to each of said side walls and having a transverse bolt, an elongated bracket having a longitudinal axis and an end provided with a fork which is snappable on said transverse bolt, and at least one tightening cam outwardly engaging said fork, said bracket being held on said front plate so that its longitudinal axis extends normal to said front plate.

2. A drawer as defined in claim 1, wherein each of said side walls has a rear region; and further comprising a plurality of fork-like guide portions each arranged in a respective one of said side walls and open toward said rear region of the latter, each of said hasps being snappable into a respective one of said fork-like guide portions.

3. A drawer as defined in claim 2; and further comprising a plurality of insert parts each insertable into the chamber of a respective one of said side walls, said fork-like guide portions being formed on said insert parts.

4. A drawer as defined in claim 1, wherein each of said hasps is provided with only one such cam arranged at one side of the former, each of said transverse bolts extending on a respective one of said hasps at said one side, each of said hasps having a support bolt formed at an opposite side of the respective hasp.

5. A drawer as defined in claim 3, wherein each of said hasps is provided at its periphery with two diametrically opposite notches, each of said insert part being provided with an engagement shoulder snappable into said notches of a respective one of said hasps.

6. A drawer as defined in claim 5, wherein each of said hasps is turnable by 180° between an operative position and inoperative position, said cam forming an introduction opening which in the operative position of the respective hasp points toward the rear region of the respective side wall and in the inoperative position of the same hasp points toward the front region of the same, each of said hasps being fixable in said positions by engagement of said engagement shoulder in the respective one of said notches.

7. A drawer as defined in claim 4, wherein said support bolt of each of said hasps has a head provided with a transverse slot.

8. A drawer as defined in claim 1, wherein said transverse bolt of each of said hasps has a predetermined diameter, said fork of each of said brackets having a free end and being provided at said free end with oppositely arranged engagement shoulders arranged with a clearance which is smaller than the diameter of said transverse bolt.

9. A drawer as defined in claim 1, wherein said connecting means includes a support plate mountable on said front plate, said bracket being formed of one piece with said support plate.

10. A drawer as defined in claim 9, wherein said support plate is provided with mounting dowels for mounting on said front plate.

11. A drawer as defined in claim 10, wherein said support plate is provided with through bores for mounting screws, for mounting on said front plate.

12. A drawer as defined in claim 1, wherein each of said brackets is provided with a recess in the region in which said tightening cam of the respective hasp engages said fork of the respective bracket.

13. A drawer as defined in claim 1, each of said side walls having a front upper region closed by a front upper wall provided with an insert opening, each of said brackets extending through said insert opening of said front upper wall of a respective one of said side walls.

14. A drawer as defined in claim 13, wherein each of said front upper wall and said support plate have facing surfaces which face toward one another and are provided with a cross-like structure.

15. A drawer as defined in claim 13, wherein each of said front upper walls has a front surface facing toward said front plate and is provided with yielding tongues projecting with respect to said front surfaces.

16. A drawer as defined in claim 3, wherein each of said insert parts is provided with at least one catch hook and one support rib, each of said side walls having a front upper region closed by a front upper wall with an opening in which said catch hook of the respective insert part engages, and each of said side walls also having a transverse rib which supports said support rib of the respective insert part.

17. A drawer as defined in claim 3, wherein said side walls have a predetermined length, said insert parts extending over the entire length of said side walls and having lower regions formed as guide bars.

* * * * *

UNITED STATES PATENT AND TRADEMARK OFFICE
CERTIFICATE OF CORRECTION

PATENT NO. : 4 458 965
DATED : July 10, 1984
INVENTOR(S) : Heinz Ohlendorf, Bad Salzuflem; Hans Riepe, Enger, both of Fed. Rep. of Germany It is certified that error appears in the above—identified patent and that said Letters Patent is hereby corrected as shown below:

The title page should be deleted to appear as per attached title page.

Signed and Sealed this

Eleventh Day of February 1986

[SEAL]

Attest:

DONALD J. QUIGG

Attesting Officer

Commissioner of Patents and Trademarks

United States Patent [19]

Ohlendorf et al.

[11] Patent Number: 4,458,965
[45] Date of Patent: Jul. 10, 1984

[54] DRAWER MADE OF PLASTIC

[75] Inventors: Heinz Ohlendorf, Bad Salzuflen; Hans Riepe, Enger, both of Fed. Rep. of Germany

[73] Assignee: Paul Hettich GmbH & Co., Kirchlengern, Fed. Rep. of Germany

[21] Appl. No.: 380,013

[22] Filed: May 19, 1982

[30] Foreign Application Priority Data

May 21, 1981 [DE] Fed. Rep. of Germany ....... 3120181

[51] Int. Cl.³ .............................................. A47B 88/00
[52] U.S. Cl. ................................. 312/330 R; 312/204; 312/263; 403/316; 403/321
[58] Field of Search .................... 312/330, 257 A, 204, 312/263, 264; 403/316, 315, 322, 341, 321; 292/190

[56] References Cited

U.S. PATENT DOCUMENTS

| | | | |
|---|---|---|---|
| 1,907,506 | 5/1933 | Coburn | 403/315 |
| 3,687,512 | 8/1972 | Alston | 312/330 |
| 4,113,397 | 9/1978 | Snyder | 403/316 |
| 4,120,598 | 10/1978 | Zernig et al. | 312/263 |
| 4,131,376 | 12/1978 | Busse | 312/263 |
| 4,173,380 | 11/1979 | Düpree | 312/330 |

FOREIGN PATENT DOCUMENTS

| | | | |
|---|---|---|---|
| 630416 | 11/1961 | Canada | 312/263 |
| 2812922 | 5/1979 | Fed. Rep. of Germany | 312/263 |
| 1311150 | 5/1963 | France | 312/263 |
| 860686 | 2/1961 | United Kingdom | 312/263 |

Primary Examiner—William E. Lyddane
Assistant Examiner—Thomas A. Rendos
Attorney, Agent, or Firm—Michael J. Striker

[57] ABSTRACT

A drawer of plastic has a front plate, a body part with a front face to arrange the front plate parallel to the latter and a plurality of side walls each forming a downwardly open chamber and having a front region adjacent to the front face, and elements for connecting the front plate with the side walls and including a hasp arranged in the front region of each of the side walls and having a transverse bolt, an elongated bracket having a longitudinal axis and an end provided with a fork which is snappable on the transverse bolt, and at least one tightening cam outwardly engaging the fork, wherein the bracket is held on the front plate so that its longitudinal axis extends normal to the front plate and also is movable in a direction normal to the longitudinal axis.

17 Claims, 7 Drawing Figures